Sept. 25, 1962 R. K. TOWRY 3,055,168
CHAIN LINK WITH KEYED REMOVABLE WEAR INSERT
Filed Jan. 11, 1960
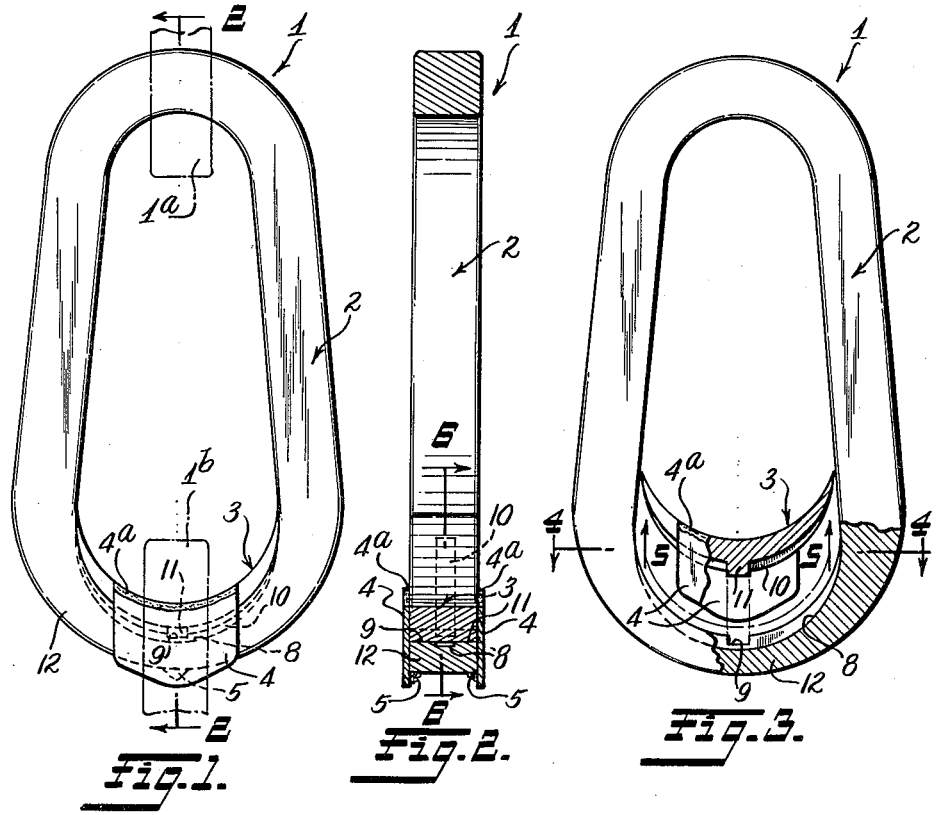
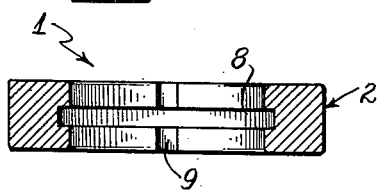
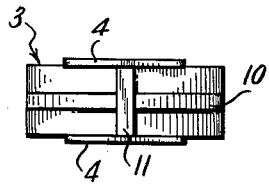
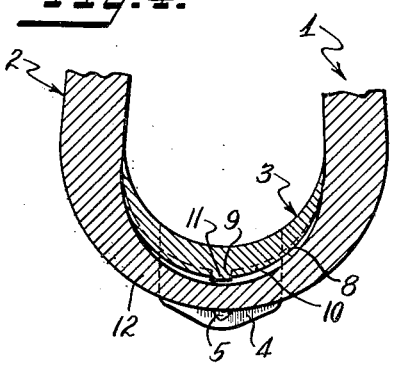
INVENTOR.
Robert K. Towry
BY
Bacon & Thomas
ATTORNEYS

United States Patent Office 3,055,168
Patented Sept. 25, 1962

3,055,168
CHAIN LINK WITH KEYED REMOVABLE WEAR INSERT
Robert K. Towry, Rte. 4, Box 340, Ocala, Fla.
Filed Jan. 11, 1960, Ser. No. 1,770
1 Claim. (Cl. 59—84)

The present invention relates to improvements in chain link construction and, more specifically, to a chain link construction including a replaceable wear-resisting insert.

In most chain links, wear occurs at the end portion of the links, so that in due time links become thinner and weaker at this portion. Worn and weakened links must be removed and replaced by new ones, a procedure which is both time consuming and costly. Therefore, it is an object of this invention to provide a chain construction in which the region normally subjected to the greatest wear comprises a removable element whereby only the worn portion of the link need be replaced.

Another object of this invention is to prolong the useful life of a chain link by attaching thereto a replaceable wear insert.

Another object is to provide a chain link with a wear insert that will remain in position and not be displaced by friction or heavy loads.

Another object is to provide a chain link construction in which a wear insert is accurately seated and retained on a particular portion of a chain link.

These and other objects and advantages of the invention will become more apparent from the following description taken with the accompanying drawing, in which:

FIG. 1 is a side elevational view of the improved chain link with a wear insert seated thereon;

FIG. 2 is a sectional view taken on line 2—2 of FIG. 1;

FIG. 3 is a side view partially broken away and showing the insert detached and spaced from the lower end of the link;

FIG. 4 is a sectional view taken on line 4—4 of FIG. 3;

FIG. 5 is a bottom view of the wear insert as seen along line 5—5 of FIG. 3; and FIG. 6 is a sectional view taken on the line 6—6 of FIG. 2.

Referring to the drawings, chain link 1 includes a closed loop body member 2 with a generally crescent-shaped wear insert 3 attached thereto. The closed loop body 2 is square in cross-section and is shown as being elliptical in form as viewed in side elevation in FIGS. 1 and 3, but the principles of the invention may be applied to a chain link body of any other cross-sectional configuration, such as circular, oval, rectangular, et cetera.

Wear insert 3 is attached to the inner surface of chain link body 2 at the portion where greatest wear will normally occur. Sheet metal tabs 4 are employed for attaching insert 3 to body 2 and may be secured to the sides of insert 3 as by welds 4a. The tabs 4 extend beyond the lower side edges of wear insert 3, so that, when wear insert 3 is seated on link body 2, a portion of the chain link body 2 is snugly confined between tabs 4, as best shown in FIG. 2. Actually, the tabs 4 are of sufficient height to extend beyond the lower edge of the body 2. In order to secure insert 3 to chain link body 2, tabs 4 may be attached to body 2 as by small, localized tack welds 5. The tack welds 5 are of a character that can be readily removed or broken when it is desired to replace the insert 3. It is pointed out that insert 3 may be detachably secured in position against the inner surface of body 2 by conventional means, such as rivets or screw-threaded fasteners (not shown), suitable adhesive material (not shown), by spot-welding (not shown), or by heating insert 3 and attaching it to chain link body 2 by a shrink fit.

In order to accurately seat insert 3 on the desired portion of the inner surface of chain link body 2, and to prevent displacement of insert 3 from its seat on body 2 when link 1 is subjected to heavy loads, mating keys and keyways are employed. As best shown in FIG. 5 of the drawings, crossed keys are provided on the convex surface of wear insert 3, while crossed keyways of similar configuration are provided on the concave surface of chain link body 2, as shown in FIG. 4. One of the keyways 8 on the inner surface of chain link body 2 extends in the longitudinal direction of the loop body 2 and varies in depth from a maximum at its midpoint to zero at its opposite ends. The other keyway 9 is also on the inner surface of chain link body 2 and extends transversely thereof. The keyway 8 is deeper than, and intersects, the keyway 9 to form a cross-like configuration.

The outer convex surface of wear insert 3 is provided with raised, intersecting keys adapted to mate with and to seat in keyways 8 and 9 formed in chain link body member 2. Thus, a key 10 on the outer surface of insert 3 extends in the longitudinal direction thereof, while another key 11 extends transversely thereof. The key 10 has its maximum height at its zone of intersection with key 11 and tapers to zero at its ends. The maximum height of key 10 is equal to about half the maximum depth of keyway 8. The key 11 is of a uniform height greater than the maximum height of key 10, and of a height about equal to the depth of the groove 9. With insert 3 seated on body 2, key 10 mates with keyway 8, while key 11 mates with keyway 9.

Although crossed keys and keyways are shown in the drawings as a preferred construction, it is contemplated that the interlocking and mating of parts may include only a single key 10 or 11 and a single mating keyway 8 or 9.

As is well known, a chain link often supports heavy loads and is subjected to considerable friction due to movement between the chain link and load or between the chain links themselves. In a chain link construction including a wear insert, it is essential that relative movement between the insert and link be prevented. When chain link 1 is subjected to heavy loads, all relative movement between body 2 and insert 3 is prevented by the interlocking construction provided by keyways 8 and 9 on body member 2, mating with keys 10 and 11 on wear insert 3.

As illustrated in FIG. 1, wear insert 3 is positioned at one end portion 12 of chain link body 2, which is shown as being reduced in thickness at this portion, so that it is complementary to the convex outer surface of the insert 3. Wear insert 3 is formed in the shape of a crescent, as viewed in side elevation, as previously noted, and when seated on chain link body 2 at the portion of reduced thickness 12, completes the chain link construction, so that the link has the appearance of being of substantially the same thickness throughout.

It will be understood that a wear insert may be installed at both ends of a chain link, if desired, and that the keys and keyways may be readily formed by a forging operation. Moreover, wear inserts may be mounted in additional chain links 1a and 1b, shown in dot-and-dash lines in FIG. 1.

Whenever necessary or desirable, wear insert 3 may be easily replaced by grinding away or otherwise removing welds 5 and substituting a new wear insert for the one removed.

The terms "key" and "keyway," as used herein, are intended to include not only the classical form shown in the drawing but any equivalent, such as a raised portion adapted to mate with, and seat in, a depressed portion.

It will be understood that various changes may be made in the details of construction of the chain link and wear insert disclosed herein without departing from the principles of the invention or the scope of the annexed claim.

I claim:

A chain link construction, comprising: a closed metallic loop body member having a portion of reduced thickness at one end thereof, said body member having a first keyway projecting thereinto from said inner surface of said body member at said portion of reduced thickness and extending in the longitudinal direction of said body member, said body member having a second keyway projecting thereinto from said inner surface of said body member intersecting said first keyway; a rigid metallic wear insert seated on said body member at said portion of reduced thickness; a first key projecting from the outer surface of said insert and extending in the longitudinal direction thereof; a second key projecting from said outer surface of said insert intersecting said first key, said first and second keys on said insert mating with and being seated in said first and second keyways, respectively, on said body member; an outwardly extending tab attached to each side of said insert, said tabs embracing therebetween said portion of said body member; and means in addition to said keys and keyways attaching said tabs to said body member.

References Cited in the file of this patent

UNITED STATES PATENTS

| | | |
|---|---|---|
| 500,267 | Lindenthal | June 27, 1893 |
| 729,611 | Lane | June 3, 1903 |
| 803,987 | Carter | Nov. 7, 1905 |
| 857,449 | Currie | June 18, 1907 |
| 2,710,235 | Olsen | June 7, 1955 |

FOREIGN PATENTS

| | | |
|---|---|---|
| 344,934 | Germany | Dec. 2, 1921 |
| 612,786 | Germany | May 4, 1935 |